United States Patent [19]

Johnson et al.

[11] 4,439,481
[45] Mar. 27, 1984

[54] RESOLE TREATED PAPERMAKERS FELT AND METHOD OF FABRICATION

[75] Inventors: Cary P. Johnson, Clifton Park; Jerry G. Sokaris, Troy, both of N.Y.

[73] Assignee: Albany International Corp., Albany, N.Y.

[21] Appl. No.: 472,080

[22] Filed: Mar. 4, 1983

[51] Int. Cl.$^3$ .............................................. B32B 5/02
[52] U.S. Cl. .................... 428/235; 34/243 F; 139/383 A; 156/148; 162/358; 162/DIG. 1; 428/234; 428/280; 428/300
[58] Field of Search ............... 428/234, 235, 280, 300; 156/148; 162/358, DIG. 1; 139/383 A; 34/243 F

[56] References Cited

U.S. PATENT DOCUMENTS 4,187,618  2/1980  Diehl .................................. 428/235
4,267,227  5/1981  Schiher et al. ...................... 428/235

Primary Examiner—James J. Bell
Attorney, Agent, or Firm—Kane, Dalsimer, Kane, Sullivan and Kurucz

[57] ABSTRACT

The disclosure is of a papermakers wet-press felt fabric, felts made therefrom and their use, as wet press felts on papermaking machines.

6 Claims, 3 Drawing Figures

RESOLE TREATED PAPERMAKERS FELT AND METHOD OF FABRICATION

BACKGROUND OF THE INVENTION

1. Field of the Invention

The invention relates to papermakers felts and more particularly relates to a wet press felt for use in the press section of a papermaking machine and the method of its fabrication.

2. Brief Description of the Prior Art

The conventional papermaking machine can be described as a highly sophisticated means of removing water from a dispersion or paper furnish. The machine includes three distinctly separate sections, beginning with the forming section where the furnish is deposited on a traveling forming wire and initially dewatered. The web of paper formed is conveyed into the wet press section for dewatering and then into the dryer section for final drying or removal of residual water by evaporation.

An important part of the process of papermaking is the efficiency of dewatering in the wet press section. The higher the efficiency of water removal in this section, the less will be the energy requirement in the dryer section.

In the wet press section of the papermaking machine, the formed web of paper is carried by one or more endless press felts through one or more presses which force the water out of the paper web and into or through the press felt. In the past, the press felts employed to carry the paper web through the press or presses have been absorbent woven and needled fabrics which are relatively resilient and compressible throughout their thickness. A wide variety of natural and synthetic fibers, yarns, woven and non-woven fabrics have been put together in a wide variety of combinations to fabricate press felts. The objective is to arrive at a combination of felt components which will receive a maximum volume of water from the paper web as web and felt are compressed together in the nip of the press or presses, retain this water as the web and felt pass from the press nip (to minimize rewetting of the paper web) and then release the water before entering the press again. All of this must be accomplished by the felt fabric within the further requirements of structural integrity, runability, proper weight, resistance to filling with paper debris, resistance to compaction and like properties. As those skilled in the art fully appreciate, most of the fabrics employed to make wet press felts are compromises, adequate in one or more of the requirements but excelling in one or more of other desired physical properties.

Current theory holds that if the wet-press fabric were more stiff and inflexible and resistant to compression, there would be an enhancement of water removal. However, if the fabric had less resistance than now provided in wet-press felts, it would be very difficult to install on the papermaking machine. Thus, another compromise has been necessary. In order to facilitate installation of the felt on the papermaking machine, the stiffness, resiliency and compressibility of the fabric has been limited to a maximum specification.

The fabrics and the method of the present invention obviate the prior art problem and permit the use of wet-press felts having higher degrees of incompressibility, without encountering undue trouble in installing them on the papermaking machine.

SUMMARY OF THE INVENTION

The invention comprises an intermediate wet-press felt fabric, which comprises;
a first layer of interwoven machine direction and cross-machine direction yarns; and
a second layer of non-woven staple fibers, needled to the first layer;
said yarns and fibers being coated with a film of a synthetic, cross-linkable, polymeric resin. The term "intermediate" means the fabric is in an unfinished state, requiring treatment before it can be used as a wet-press felt.

The invention also comprises the method of manufacturing a wet-press papermakers felt, which comprises; providing an intermediate fabric of the invention and cross-linking the cross-linkable resin.

DETAILED DESCRIPTION OF THE PREFERRED EMBODIMENT OF THE INVENTION

Figure 1:
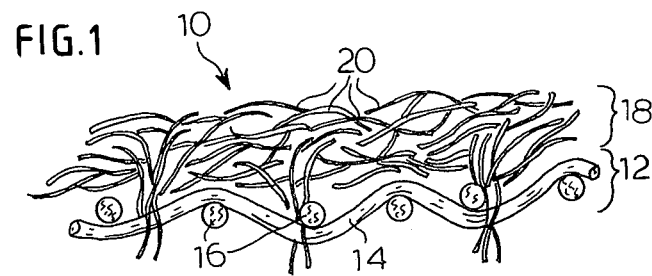
FIG. 1 is a cross-sectional side elevation parallel to the machine direction of a portion of an embodiment fabric of the invention.

FIG. 1 is a cross-sectional, side elevation of a portion of an embodiment fabric 10 of the invention and shows the multi-layer construction thereof including layers 12, 18. The layer 12 comprises a fabric made by the interweaving of a plurality of machine direction yarns 14 with a plurality of cross-machine direction yarns 11. A simple weave is shown but any conventional weave pattern, single or multi-layered, may be used although a relatively open weave is preferred. The yarns 14, 16 may be any conventional fabric yarns such as spun, multifilament or monofilament yarns of natural, synthetic or mixed natural/synthetic textile material. Preferred are spun or multifilament yarns of synthetic textile fibers such as fibers of polyamides, polyesters, polyurethanes, polyaramids and the like. Monofilament represented by the same synthetic polymeric resins may also be used advantageously. The yarns 14, 16 preferably have a denier per filament within the range of from about 2 to about 80.

Layer 18 is a web of non-woven, staple fibers 20 such as of the staple fibers described above. The layers 12 and 18 of the fabric 10 are joined to each other by needling so that the staple fibers 20 are integrated throughout all layers 12 and 18. The techniques of needling are well-known and details need not be recited herein.

Figure 2:
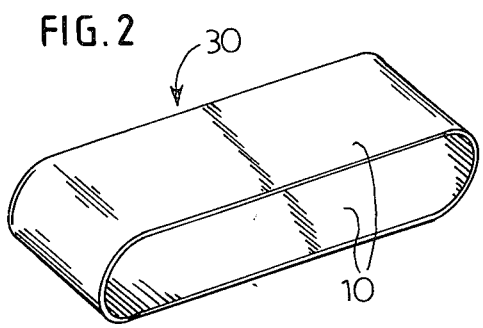
FIG. 2 is a view-in-perspective of an embodiment wet press felt fabricated from the fabric shown in FIG. 1.

The fabric 10 is particularly useful in the fabrication of wet press felts for use in the press section of a papermakers machine. Shown in FIG. 2 is fabric 10, made endless to obtain a wet press felt 30 of the invention. The wet press felt fabric 10 may be either constructed endless or joined. The felt 30 may be mounted in the press section of a papermakers machine and treated as will be described hereinafter.

Figure 3:
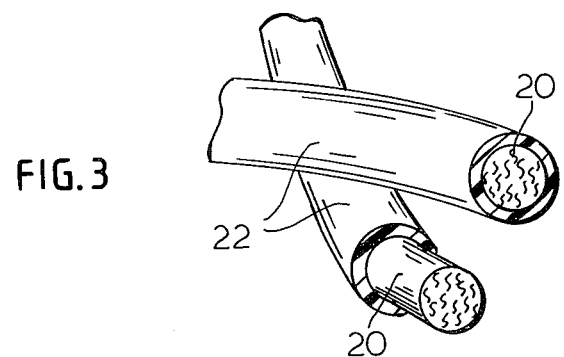
FIG. 3 is an enlarged view of fiber found in the fabric of FIG. 1.

FIG. 3 is an enlarged view of the layer 18 in the fabric 10 shown in FIG. 1 and shows that the fibers 20 have been coated with a cross-linkable, synthetic polymeric resin coating 22. The yarns 14, 16 of fabric 10 are also coated with coating 22.

The coating 22 is applied to the structural components of the fabric 10 by conventional techniques, such as by dipping, spraying and the like of the liquid preformer of the resin coating 22. When dried, the coated fibers 20 and yarns 14, 16 remain highly flexible and compressible.

Following surface coating of the staple fibers 20 with a liquid form of the resin, the coating 22 is dried in place, employing conventional drying apparatus.

The synthetic, polymeric resin coating 22 applied in the method of the invention is one which will, following application, dry to a tack-free state leaving a dry film which will not adhere to itself. It is also required that the dry resin film or coating 22 be relatively flexible but transformable by chemical reaction to a relatively rigid state. The chemical reaction may be a cross-linking of the polymer. A wide variety of such polymeric resin coatings are known and many are commercially available.

Representative of cross-linkable polymeric resins are polyolefins such as polyethylene, ethylene copolymers, polypropylene, polyamides including nylons, fluorinated ethylene propylene, polyvinylchloride, polyvinylidene fluoride, acrylic polymers and the like. These cross-linkable polymeric resins may be compounded in liquid dispersions with cross-linking agents such as divinyl benzene, polybutadiene, allyl methacrylate, divinyl succinate, ethylene glycol diacrylate, diallyl fumarate, triallyl phosphate, triallyl cyanurate and the like. These cross-linking agents will react to cross-link cross-linkable polymeric resins upon exposure of the dried dispersions to electromagnetic irradiation. Heating may also be used to activate cross-linking, if the dried resin composition also includes a free radical generating compound such as an organic peroxide or the like.

A preferred class of synthetic, polymeric resin coating employed in the method of the invention are the B-stage, thermosetting resins. Representative of such resins are fusible resole resins, fusible phenol-formaldehyde resins, melamine-formaldehyde resins and the like. Upon exposure to heat, the B-stage resins are converted to the infusible C-stage, a relatively more rigid resin form.

Another preferred class of polymeric resin used in the method of the invention are linear epoxy resins which may be cross-linked by reaction with polyamines. The polyepoxide is mixed with the polyamine and solvents to prepare flexible coatings. The coatings may be hardened upon exposure to heat. Representative of such polyepoxide systems are those described in U.S. Pat. Nos. 3,280,054; 3,436,359.

Flexible coatings 22 of hardenable polymeric resins may also be prepared from mixtures of hydroxyl-terminated polyesters and blocked polyisocyanate cross-linking agents. Upon heating, the polyisocyanate unblocks and the polyisocyanate cross-links the polyester to harden or rigidify the coating.

Generally, the resin is provided in a solution or dispersed in a carrier, preferably aqueous. A solids content of from 5 to 50 percent is generally advantageous if its resin is provided in an aqueous dispersion, although this is not a critical requirement.

The belts 30, made up of the fabric 10 as described above may be readily installed on conventional papermaking machines since the fabric 10 is relatively resilient, compressible and flexible. The coating 22 on components of the fabric do not adversely affect these properties. Following installation of the belt 30 on the machine, the belt 30 may then be finished by activating the resin film 22 to cross-link (cure) and thereby rigidify the coated fibers 20 and the coating 22 on the yarns 14, 16.

When heat is used to activate cross-linking, it is preferably done at a cross-linking temperature below the melting point of the resin from which the fibers 20 is made. After cross-linking, the fabric 10 has a higher degree of incompressibility and a higher degree of stiffness than found in the prior art wet-press fabrics. This results in a higher efficiency of water removal, when the wet press is operational.

The following example describes the manner and process of making and using the invention and sets forth the best mode contemplated by the inventors but is not to be construed as limiting.

EXAMPLE

A batt-on-mesh single layer base fabric is woven endless of single monofilament (0.016" diameter) nylon cross-machine direction yarns and a 6 ply (0.008" single nylon) machine direction yarn using a broken twill weave pattern. The base fabric is subjected to heat setting and installed on a needle loom. A texturized, multifilament sleeve is then slipped over the base fabric and needled in place. To this core, layers of non-woven batting composed of 15 denier, 3" staple nylon fibers are applied to both sides of the core fabric using needling techniques. The resulting felt is then processed in normal manner (washed, dried and finally sized for fit on a particular press position). The belt has a weight of 4.0 oz/sq. ft., permeability of approximately 45 CFM/sq. ft. of felt at ½" $H_2O$ pressure and a felt thickness of 0.140 inches.

An 18 percent by weight solution (dispersion) of a B-stageable epoxy resin (PC 2737; Polyset Chemicals, Round Lake, N.Y.) in water is prepared and 1,000 lbs. of the dispersion charged to a dip tank. The fabric described above is then dipped in the epoxy resin, squeezed in the nip of a pair of rollers and allowed to dry. The dried belt is then installed in the wet-press section of a papermakers machine. The belt is then run under radiant heaters to cure the resin coating at a temperature of circa 350° F. to increase the belt's compressibilty and stiffness.

Those skilled in the art will appreciate that many variations of the above-described preferred embodiments may be made without departing from the spirit and scope of the invention. For example, the felts of the invention may be treated by heat-setting, with chemicals, etc., as conventionally done in the art to achieve particular properties. Also, those skilled in the art will appreciate that although the invention has been described herein in terms of a single type of wet-press felt fabric, it applies to any textile felt construction, for example those described in U.S. Pat. Nos. 3,613,258 and 4,187,618.

Preferred fabrics of the invention will have a thickness of from about 1.52 to about 6.30 mm and a weight of from about 915 to about 2140 gms/m$^2$, a caliper of 0.06 to 0.25 inches and a permeability of 10-150 CFM at 0.5 inches of water pressure and a compressibility of 30-70% at 500 psi.

What is claimed:

1. An intermediate wet-press felt fabric, which comprises;

a first layer of interwoven machine direction and cross-machine direction yarns; and a second layer of non-woven staple fibers, needled to the first layer;

said yarns and fibers having a coating of a synthetic, cross-linkable, polymeric resin.

2. The fabric of claim 1 made endless.

3. A papermakers wet-press felt fabric, which comprises;

a first layer of interwoven machine direction and cross-machine direction yarns;

a second layer of non-woven, staple fibers; and a third layer of non-woven, staple fibers;

said first, second and third layers being joined together by needling;

said yarns and fibers having a coating of a cross-linkable, synthetic polymeric resin.

4. The fabric of claim 3 made endless.

5. A method of manufacturing a wet-press papermakers felt which comprises;

(1) providing an intermediate fabric which comprises;

a first layer of interwoven machine direction and cross-machine direction yarns; and a second layer of non-woven staple fibers, needled to the first layer;

(2) coating the fabric with a synthetic, cross-linkable, polymeric resin;

(3) forming the coated fabric into an endless felt form; and cross-linking the resin.

6. The method of claim 5 wherein the resin is a B-stage resin and cross-linking is by heating.

* * * * *